Dec. 22, 1953 D. J. INGLE 2,663,282
ROTARY RAT FATIGUE MACHINE
Filed Aug. 4, 1951 2 Sheets-Sheet 2

INVENTOR.
DWIGHT J. INGLE
BY

Patented Dec. 22, 1953

2,663,282

UNITED STATES PATENT OFFICE 2,663,282

ROTARY RAT FATIGUE MACHINE

Dwight J. Ingle, Kalamazoo, Mich., assignor to The Upjohn Company, Kalamazoo, Mich., a corporation of Michigan Application August 4, 1951, Serial No. 240,415

4 Claims. (Cl. 119—29)

This invention relates to a device for testing physiological reactions in a specimen animal and particularly relates to means for urging a specimen animal to continue moving at a substantially constant rate of speed along a predetermined path.

In the study of physiological reactions, including studies incident to pharmaceutical research, it is desirable to measure the effects of various substances on an animal organism which is expending a measurable amount of energy. Where such research and tests are carried on with animal specimens, rather than human specimens, a serious problem arises in causing the animal to expend measureable quantities of energy in an accurately controllable period of time. In the usual situation, the animal's movements are sufficiently erractic that the results of such testings are only rough approximations at best. Thus, it becomes desirable to devise means by which an animal undergoing a test may be caused to travel through a path of predetermined length and to do so at a sufficiently constant rate of speed that the expenditure of energy over the duration of the test will for all practical purposes occur recorded at a constant and controllable rate.

Therefore, a principal object of the invention is to provide a device by which animal specimen being used for test purposes may be caused to expend a substantially predetermined quantity of energy at a substantially constant rate.

A further object of the invention is to provide a device of the nature aforesaid in which the test animal may be cause to move in a predefined path at a substantially constant speed.

A further object of the invention is to provide a device by which a test animal may be caused to move in a predefined path at a substantially constant rate of speed for as long as the animal is physically capable of so doing.

A further object of the invention is to provide a device of the nature aforesaid in which the animal may be easily observed throughout the duration of the test.

A further object of the invention is to provide a device of the nature aforesaid which will be relatively simple to construct and which will be easy to maintain in a condition of both effective operativeness and cleanliness.

A further object of the invention is to provide a device of the nature aforesaid which is readily adaptable to collecting all of the bodily discharges of the animal during the test.

Other objects and purposes of the invention will be apparent to persons acquainted with apparatus of this general type upon reading of the following disclosure and upon reference to the accompanying drawings.

General description

Figure 1:
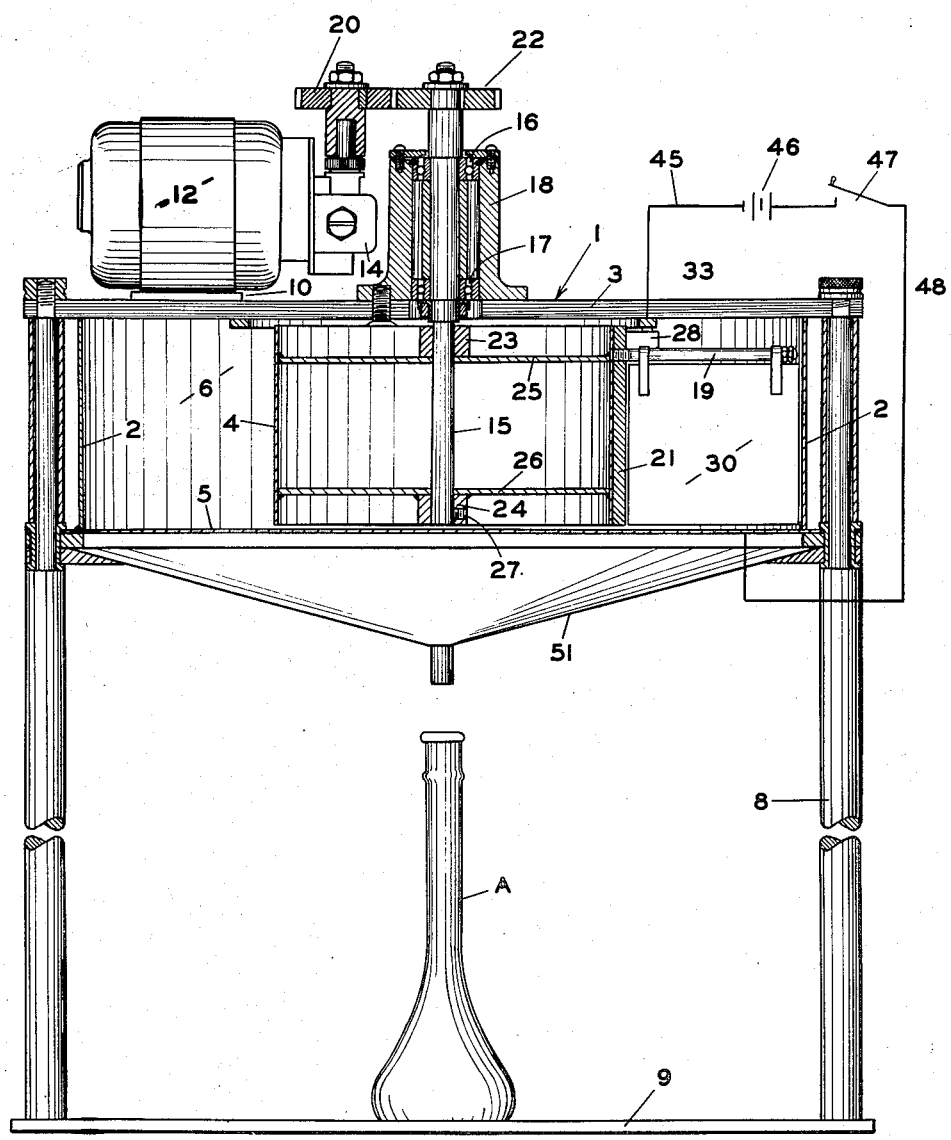
Figure 1 represents a vertical elevation, partially in central section on line I—I of Figure 2 and partially broken, of a device embodying my invention.
Figure 2:
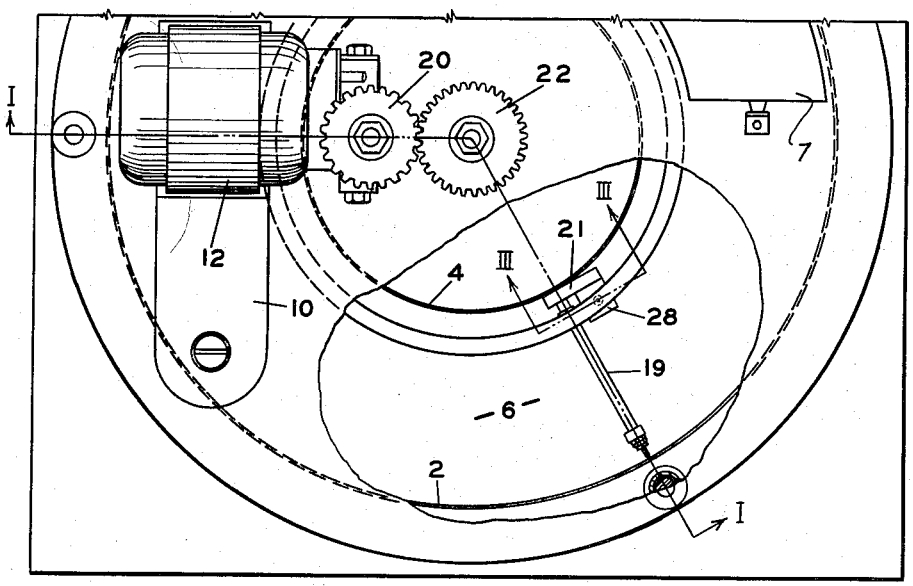
Figure 2 represents a fragmentary, partially broken, top view of the device illustrated in Figure 1.

In carrying out the above named objectives, I provide a closed annular path and arrange therein a partition, of such size as substantially to close said annular path, for movement around said path at a controllable, and usually constant, rate of speed. Further, I provide means with said partition by which an electric shock of controllable magnitude is applied to said animal when he slows his progress sufficiently that said moving partition catches up with him and thereby comes into contact with him.

Detailed description

Referring now to the drawings, there is shown an enclosure section 1 having an external wall 2, a top cover 3, which is preferably removable, an inner wall 4 and an electrically conductive floor 5. Said walls, cover and floor constitute the annular passageway 6. A gate 7 provides access into the said annular passageway.

Said enclosure section is mounted upon any conventional standard, such as the legs 8 which in turn are supported upon a base 9.

Positioned above the enclosure 1 and supported in any convenient manner, as by a bracket 10 mounted on said enclosure, is a driving motor 12. Said motor supports and drives the gear box 14, which may provide for adjustable output speeds, and through it the gear 20.

A shaft 15 is mounted co-axially with the annular passageway 6 and is rotatably supported by the bearings 16 and 17. Said bearings may be of any conventional type and mounted in any conventional manner in the bearing housing 18. Said bearing housing is conveniently mounted on, and above, the cover member 3. Said shaft is driven through a gear 22 supported thereon and in mesh with the gear 20. Mounted on said shaft 15 and below the cover member 3 is a pair of hubs 23 and 24 which support the flanges 25 and 26, respectively. The inner wall 4 is mounted on said flanges and the whole assembly fixed in position on the shaft 15 by the set screw 27.

Positioned on the inner wall 4, and secured fixedly thereto, is the partition support bar 21, which is generally rectangular in shape and of sufficient thickness to receive threadedly the arm 19 for supporting same. A block 28 is mounted onto said partition support bar 21 in any convenient manner, as by series of screws of which one appears at 29 (Figure 3).

Figure 3:
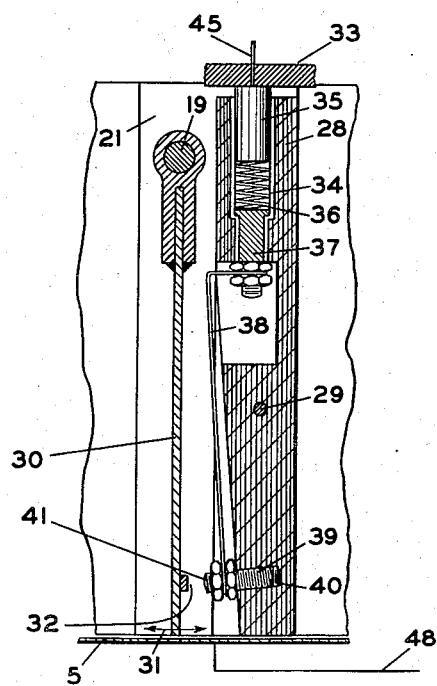
Figure 3 represents an enlarged section taken on the line III—III of Figure 2.

Pivotally suspended from said arm 19 is a partition member 30 which is comprised of electrically conductive material and which is adapted to swing freely in the arc indicated by the line 31 (Figure 3). The contact 32 is supported on said partition 30 for reasons appearing hereinafter.

The block 28 carries a suitably spaced opening 34 for the reception of a carbon brush 35, a resilient spring 36 and a pressure pin 37. Said carbon brush 35 bears against the annular slip ring 33 which is placed on the under side of the cover 3 for contact by said brush as the partition 30 moves along the passageway 6.

The pressure pin 37 on its lower end supports one end of a flexible conductor 38. The other end of said flexible conductor is supported by a screw 39 which itself is threadedly received into an opening 40 in the lower end of the block 28. The outer end 41 of the screw 39 serves as a second contact acting in cooperation with the contact 32. Adjustment of the screw 39 with respect to the block 28 determines the magnitude of the gap between said two contacts.

A conductor 45 connects the annular ring 33 to one side of a source 46 (Figure 1) of constant electrical potential. The other side of said source is connected through a manually operable switch 47 by the conductor 48 to the electrically conductive floor 5.

Where it is desired to collect the bodily discharges from the animal during the duration of the test, the floor 5 will be made of perforated material, as a metallic screen, and a funnel 51 may be placed therebelow for collecting said discharges and conducting same into a container indicated at A.

Operation

The operation of this device will be self-evident from the foregoing description, but will be detailed in the interest of completeness.

With the gate 7 opened, the animal is placed into the annular passageway 6 and facing in the direction of desired movement. The gate is then closed, the gear box 14, if adjustable, is set to cause revolution of the partition 30 at the rate of speed at which it is desired to have the animal move and the motor is started. As the partition approaches the animal, he may or may not move away from it but if he does he cannot move further than a single lap of said annular passageway, which in comparison with the total distance which the animal is to travel is inconsequential. If the animal does not move away from the partition it will soon touch him and move the contact 32 back against the outer end 41 of the screw 39 which serves as a second contact. This completes a circuit through the animal and applies a light shock. After a few such shocks, the animal learns to keep away from said partition and will travel at a rate sufficient to enable him to keep ahead of said partition for so long as he is physically able to do so. As he weakens and slows his pace he receives additional and repeated shocks which keep him moving until he is completely exhausted or until the test is stopped for other reasons.

Inasmuch as the animal can travel only one lap ahead of the moving partition, it is obvious that during the course of a test involving several dozen, or even several hundred, such laps the rate of speed at which the animal travels is constant for all practical purposes. Thus, the amount of energy utilized by the animal over the period of the test can be calculated quite precisely and conclusions respecting food given to the animal, or other conditions of the test, drawn with precise accuracy.

It will also be observed that by the simple expedient of varying the speed of revolutions of said partition, the rate of energy consumption by the animal can be varied at will and varied with a high degree of accuracy.

Accordingly, a device has been disclosed carrying out the objects and purposes above enumerated as well as others incident and related thereto.

While one preferred embodiment of the invention has been here selected for illustrative purposes, it will be apparent to those skilled in the art that many modifications may be made from the specific embodiment there shown without departing from the principle of the invention and, accordingly, such modifications will all be included within the scope of the hereinafter appended claims excepting as said claims may be their own terms expressly require otherwise.

I claim:

1. In a device for effecting movement of an animal being subjected to testing with respect to its expenditure of energy, the combination comprising: an enclosure defining an endless passageway, an electrically conductive floor for said passageway; an electrically conductive partition substantially closing said passageway; a source of constant electrical potential; means applying an electrical potential to said partition from one side of said source; the other side of said source being connected to said floor; means operatively connected to said partition for moving said partition around the length of said passageway at a predetermined rate of speed.

2. In a device for effecting movement of an animal being subjected to testing with respect to its expenditure of energy, the combination comprising: an enclosure defining an endless passageway, said enclosure including electrically conductive means constituting the floor of said passageway; a support bar; a normally vertical, electrically conductive, partition pivotally supported on said support bar; an electrical contact supported on said support bar and a further electrical contact supported on said partition whereby movement of said partition toward said support bar will close said electrical contacts; a source of constant electric potential connected on one side to said first named contact and on the other side connected to said floor; means operatively connected to said support bar for moving said support bar around the length of said passageway at a predeterminable rate of speed.

3. In a device for effecting movement of an animal being subjected to testing with respect to its expenditure of energy, the combination comprising: an enclosure defining an endless path; said enclosure having an electrically conductive floor; a partition substantially closing said path; means connected to said partition for moving said partition around said path at a predetermined rate of speed; an electrical circuit including said partition and floor, said circuit being closed through said animal when said animal forces said partition oppositely to the direction of movement of said partition.

4. In a device for effecting movement of an animal being subjected to testing for energy output, the combination comprising: a floor of electrically conductive material, a circular outer wall and a cover defining a closed endless chamber; a central shaft rotatably supported coaxially with said outer wall; a circular inner wall coaxially mounted on said shaft for rotation therewith and defining an endless passageway; means operatively associated with said shaft for rotating said shaft at a predetermined rate of speed; a rod mounted on said inner wall and extending radially of said shaft in said passageway; an electrically conductive partition substantially closing said passageway dependently pivoted to said rod; a vertically arranged block member mounted to said inner wall adjacent to and behind said partition with respect to the movement of said partition along said passageway; a first electrical contact supported on said partition and extending toward said block member and a second electrical contact member supported on said block member and extending toward said first electrical contact, an electrically conductive ring supported on said cover and a brush connected to said second contact carried on said block member in electrical contact with said ring; a source of electrical potential connected on one side to said ring and on the other side to said floor.

DWIGHT J. INGLE.

References Cited in the file of this patent

UNITED STATES PATENTS

| Number | Name | Date |
|---|---|---|
| 536,714 | Arnold et al. | Apr. 2, 1895 |
| 611,876 | Walsh | Oct. 4, 1898 |
| 821,395 | Arthurs | May 22, 1906 |
| 2,428,875 | Hantz | Oct. 14, 1947 |
| 2,500,805 | Costello | Mar. 14, 1950 |